Patented Feb. 22, 1927.

1,618,484

UNITED STATES PATENT OFFICE.

STANLEY D. SHIPLEY AND GUY C. GIVEN, OF STAMFORD, CONNECTICUT, ASSIGNORS TO ATLAS POWDER COMPANY, OF WILMINGTON, DELAWARE, A CORPORATION OF DELAWARE.

LACQUER AND LACQUER ENAMEL.

No Drawing. Application filed April 18, 1925. Serial No. 24,261.

This invention relates to lacquers and lacquer enamels; and it comprises as a new coating composition, a composition containing nitrocellulose with, or without, another coating or filming substance such as a resin, said nitrocellulose being brought into solution with the aid of an amyl glycol, the composition also advantageously comprising non-solvent liquids such as benzene; and the invention further comprises a method of making coating compositions wherein nitrocellulose is brought into solution with the aid of an amyl glycol; all as more fully hereinafter set forth and as claimed.

Nitrocellulose varnishes and lacquers are well known materials; these compositions being solutions of nitrocellulose in one solvent liquid or another. Amyl acetate is quite generally used. It has been found by experience, that the properties of the composition depend very greatly upon the solvent used with the nitrocellulose; i. e. as to its strength, luster, free-flowing qualities, adhesion, flexibility, viscosity, etc., etc. Sometimes, in lacquer work, a solution is wanted, not containing over say 5 ounces of nitrocellulose per gallon, to give a film of proper thickness, while in other work, sometimes a very heavy film is wanted. In the latter case, sometimes there are required solutions containing as high as 20 ounces of nitrocellulose per gallon. In each case, a special viscosity may be wanted. With all nitrocellulose solutions, it is customary to employ more or less of what is called a "non-solvent" as a diluent, this being benzene, toluene, xylene, gasoline, etc., etc. The various alcohols, ethyl, methyl, propyl, butyl, amyl, etc. are also employed as thinners. The function of the non-solvent is to modify viscosity and prevent "blushing," or "blooming" on drying; or the separation by settling of jelly-like masses.

In a prior Patent No. 1,533,616, April 14, 1925, we have described and claimed an improvement in this art wherein are utilized the advantageous properties of ethyl glycol; an ethyl ether of ethylene glycol. This body has a vapor tension, adapting it for use in many relations in the varnish and lacquer art combined with excellent solvent qualities for nitrocellulose. The nitrocellulose solutions formed with its aid withstand much dilution with non-solvents; it being practicable in some cases to make satisfactory compositions with solvent mixtures containing as high as 3 parts of benzene to 2 parts of ethyl glycol. With the aid of ethyl glycol enamels and lacquers having a wide variety of uses may be produced; it being practicable to use with the ethyl glycol, any of the ordinary nitrocellulose solvents, (such as acetone, alcohols, alcohol esters), also the ordinary nonsolvents (such as aliphatic and aromatic hydrocarbons—or mixtures of the same). And the solutions so produced can be blended with various resins or resin compositions used for coating purposes. It is also possible to use the ordinary latent solvents such as camphor, tricresylphosphates, etc.

We have found that for many purposes the use of an amyl glycol is highly advantageous; this being particularly the case where slow drying varnishes are wanted and where other materials are to be united with the nitrocellulose in making composite varnishes. The amyl glycols are compatible with the various vegetable oils, drying and semi-drying, such as linseed oil, soya oil, China wood oil, tung oil, etc. And the amyl glycols are further an excellent solvent for a wide variety of natural and artificial resins, such as gum kauri, or ester gum. These properties render the amyl glycols particularly advantageous in the production of composite varnishes and lacquers in which nitrocellulose is only one coating component and may even be a minor component. As a matter of fact, with the aid of the amyl glycols, nitrocellulose can be easily and advantageously embodied in many of the ordinary paints and varnishes.

For the present purposes an amyl glycol may be defined as a body resulting from the substitution of a 5-carbon alkyl or pentyl for one hydrogen in a hydroxyl of ethylene glycol; the general formula being $$HO.CH_2.CH_2.OC_5.H_{11}.$$

There are various isomeric amyl glycols, all of which are useful for our purposes, singly, or in admixture. The ordinary fusel oil of commerce may be employed as raw material in making amyl glycols irrespective of the particular amyl alcohols which it may contain.

In a specific example of our invention in producing a slow drying, free flowing, good leveling varnish, 1 part by weight of nitrocellulose is dissolved in about 7 parts by weight of a composite solvent generally containing amyl glycol and a hydrocarbon in about the ratio of 2:3. The hydrocarbon non-solvent may be benzene, toluene, xylene or gasoline, or a mixture of two or more of these bodies. It is often advantageous to employ all four with slightly greater proportion of toluene than of the other bodies. It is one of the advantages however, of the amyl glycols that they will tolerate larger proportions of petroleum hydrocarbon than is the case with the ordinary solvents for nitrocellulose. For cheap lacquers, as a matter of fact, a large proportion of gasoline or solvent naphtha or "turpentine substitute" may be employed. Returning to the specific example, it is commonly useful to further thin the composite solvent just described, with some alcohol; say about 25%. This added alcohol may be butyl alcohol, or denatured ethyl alcohol, or a mixture of the two. A mixture of equal volumes of ethyl and butyl alcohol serves well. The composition made as just described is a good lacquer of general applicability. For special purposes, it may receive an addition of a resin, natural or artificial. Usually, it is not desirable to add more than about, say 1 part by weight of resin, for every 2 parts by weight of nitrocellulose. Instead of using a resin, a drying oil may be added, or both a resin and the drying oil. For some purposes, the nitrocellulose composition described, with an addition of say 10% of linseed oil, makes a coating composition of new, unique and useful properties. Returning to the described composition, where a lacquer enamel is wanted, any compatible pigment may be admixed. About 2 parts by weight of zinc oxid for each part of nitrocellulose, is often desirable. A little castor oil and a little camphor (either or both) may sometimes be added with advantage.

One of the greatest advantages of the amyl glycols for the present purposes, is their freedom from strong or offensive odor, but where odor is not objectionable in the coating composition, the ordinary nitrocellulose solvents may be used to replace some of much of the amyl glycol without forfeiting all its advantages; particularly the freedom from deposition of nitrocellulose or admixture of non-solvents. In a typical composition where ordinary solvents are employed, a half or quarter of the amyl glycol in the described embodiment may be replaced by a similar amount of ethyl acetate, methyl acetate, propyl acetate, butyl acetate or amyl acetate, or a mixture of two or more of these acetates. While we mention the acetate esters particularly, it will, of course, be understood that any other nitrocellulose solvent may be used in their lieu in making composite varnishes containing amyl glycol as a solvent.

What we claim is:—

1. A coating composition containing nitrocellulose, amyl glycol and a resin soluble in amyl glycol.

2. A coating composition containing nitrocellulose, amyl glycol, a pigment and a resin soluble in amyl glycol.

3. A coating composition containing nitrocellulose, amyl glycol, a pigment, a resin soluble in amyl glycol, and a drying oil.

4. A coating composition containing nitrocellulose, amyl glycol, a pigment, a resin soluble in amyl glycol, a drying oil and an alcohol.

5. A coating composition containing nitrocellulose, amyl glycol and gasoline.

6. A coating composition containing nitrocellulose, amyl glycol, gasoline and a resin soluble in amyl glycol.

7. A coating composition containing nitrocellulose, amyl glycol, gasoline, a resin soluble in amyl glycol and a pigment.

8. A coating composition containing nitrocellulose, amyl glycol, gasoline and a pigment.

9. A film containing nitrocellulose, amyl glycol and a resin soluble in amyl glycol.

10. A film containing nitrocellulose, amyl glycol, a pigment and a resin soluble in amyl glycol.

11. A film containing nitrocellulose, amyl glycol, a pigment, a resin soluble in amyl glycol and a vegetable drying oil.

12. A film containing nitrocellulose, amyl glycol, a pigment, a resin, soluble in amyl glycol, a vegetable drying oil and an alcohol.

13. A coating composition containing nitrocellulose, amyl glycol, a resin soluble in amyl glycol and a vegetable drying oil.

In testimony whereof, we have hereunto affixed our signatures.

STANLEY D. SHIPLEY.
GUY C. GIVEN.